United States Patent
Tamura et al.

(10) Patent No.: US 11,248,489 B2
(45) Date of Patent: Feb. 15, 2022

(54) MONITORING SENSOR FOR STATE OF BLADE OF ROTATING MACHINE, POSITION ADJUSTMENT METHOD FOR SENSOR, AND ROTATING MACHINE

(71) Applicant: Mitsubishi Hitachi Power Systems, Ltd., Yokohama (JP)

(72) Inventors: Kazuhiro Tamura, Tokyo (JP); Takeo Baba, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/762,321

(22) PCT Filed: Nov. 29, 2018

(86) PCT No.: PCT/JP2018/043906
§ 371 (c)(1),
(2) Date: May 7, 2020

(87) PCT Pub. No.: WO2019/107474
PCT Pub. Date: Jun. 6, 2019

(65) Prior Publication Data
US 2020/0347747 A1 Nov. 5, 2020

(30) Foreign Application Priority Data
Nov. 30, 2017 (JP) .............................. JP2017-230939

(51) Int. Cl.
*F01D 21/00* (2006.01)
*F02C 7/20* (2006.01)

(52) U.S. Cl.
CPC .............. *F01D 21/003* (2013.01); *F02C 7/20* (2013.01); *F05D 2220/31* (2013.01)

(58) Field of Classification Search
CPC .......... F01D 21/003; F01D 25/28; F02C 7/20; F05D 2220/31; F05D 2230/644;
(Continued)

(56) References Cited

U.S. PATENT DOCUMENTS

| 4,817,417 A | 4/1989 | Twerdochlib |
| 4,833,931 A | 5/1989 | Twerdochlib |

(Continued)

FOREIGN PATENT DOCUMENTS

| DE | 10 2014 215 449 B4 | 10/2016 |
| JP | 63-286727 A | 11/1988 |

(Continued)

OTHER PUBLICATIONS

International Search Report dated Feb. 26, 2019, issued in counterpart Application No. PCT/JP2018/043906 (15 pages).
(Continued)

*Primary Examiner* — Hoang M Nguyen
(74) *Attorney, Agent, or Firm* — Westerman, Hattori, Daniels & Adrian, LLP

(57) ABSTRACT

A monitoring sensor for a state of a blade of a rotating machine includes a sensor for monitoring a state of the blade of the rotating machine, a first section configured to be fixed to a casing of the rotating machine, and a second section holding the sensor and supported by the first section so as to be able to adjust a position of the sensor in an axial direction of the casing.

10 Claims, 13 Drawing Sheets

(58) Field of Classification Search
CPC ........... F05D 2260/36; F05D 2250/312; F05D 2270/334; F05D 2270/80; G01H 1/006
USPC ............................. 415/118, 1, 14, 126, 173.2
See application file for complete search history.

(56) References Cited

U.S. PATENT DOCUMENTS

| | | | |
|---|---|---|---|
| 8,894,358 B2 * | 11/2014 | Bacic | F01D 11/20 415/126 |
| 10,436,612 B2 * | 10/2019 | Ford | F01D 21/003 |
| 2006/0140754 A1 * | 6/2006 | Tanioka | F01D 17/02 415/173.1 |
| 2009/0169362 A1 * | 7/2009 | Wadia | F04D 29/526 415/118 |
| 2009/0169363 A1 * | 7/2009 | Wadia | F04D 27/02 415/118 |
| 2013/0017082 A1 | 1/2013 | Casavant | |
| 2013/0039743 A1 * | 2/2013 | Willett, Jr. | F01D 25/243 415/118 |
| 2017/0219023 A1 | 8/2017 | Haupt et al. | |

FOREIGN PATENT DOCUMENTS

| | | |
|---|---|---|
| JP | 64-66402 A | 3/1989 |
| JP | 4-34634 U | 3/1992 |
| JP | 2003177059 A | 6/2003 |
| JP | 2012-88200 A | 5/2012 |
| JP | 5669633 B2 | 2/2015 |
| JP | 6104838 B2 | 3/2017 |
| JP | 2017-524115 A | 8/2017 |
| JP | 2017-186907 A | 10/2017 |

OTHER PUBLICATIONS

International Preliminary Report on Patentability dated Jun. 11, 2020, issued in counterpart International Application No. PCT/JP2018/043906, with English translation (26 pages).

Office Action dated Aug. 30, 2021, issued in counterpart DE application No. 11 2018 005 393.8, with English translation. (15 pages).

* cited by examiner

MONITORING SENSOR FOR STATE OF BLADE OF ROTATING MACHINE, POSITION ADJUSTMENT METHOD FOR SENSOR, AND ROTATING MACHINE

TECHNICAL FIELD

The present disclosure relates to a monitoring sensor for the state of a blade of a rotating machine, a position adjustment method for a sensor, and a rotating machine.

BACKGROUND

A rotating machine may be provided with a monitoring sensor for monitoring the state of each component such as a blade and a rotor shaft. To appropriately monitor the monitoring object by the monitoring sensor, it is necessary to place the monitoring sensor at an appropriate position relative to the monitoring object. For instance, with respect to a sensor for detecting the displacement of a rotor shaft of a compressor in a radial direction, a sensor attachment structure which enables adjustment of the distance between the rotor shaft and the sensor attached to a radially outer casing is known (see Patent Document 1).

CITATION LIST

Patent Literature

Patent Document 1: JP2012-88200A

SUMMARY

Problems to be Solved

For instance, in the case of detecting vibration of a rotating blade of a rotating machine, a sensor for detecting vibration of the rotating blade is often attached to a casing on the radially outer side of the rotating blade.

However, during operation of the rotating machine, the rotating blade or the casing may deform by thermal expansion due to temperature increase caused by the operation, leading to a change in relative position between the rotating blade and the sensor. For instance, when the relative position between the rotating blade and the sensor changes in the axial direction of the casing, the rotating blade may be out of the detection range of the sensor. Accordingly, it is desired to be able to adjust the position of the sensor in the axial direction of the casing.

Unfortunately, the sensor attachment structure disclosed in Patent Document 1 can adjust the distance between the sensor and the rotor shaft but cannot adjust the position of the sensor in the axial direction of the casing.

In view of the above, an object of at least one embodiment of the present invention is to provide a monitoring sensor for the state of a blade of a rotating machine whereby it is possible to monitor the state of the blade even if the blade or the casing deforms by thermal expansion or the like.

Solution to the Problems (1) A monitoring sensor for a state of a blade of a rotating machine according to at least one embodiment of the present invention comprises: a sensor for monitoring a state of the blade of the rotating machine; a first section configured to be fixed to a casing of the rotating machine; and a second section holding the sensor and supported by the first section so as to be able to adjust a position of the sensor in an axial direction of the casing.

With the above configuration (1), even if the relative position between the blade and the sensor changes in the axial direction of the casing by thermal expansion or the like of the blade or the casing due to temperature increase during operation of the rotating machine, since the position of the sensor can be changed in the axial direction of the casing, it is possible to monitor the state of the blade.

(2) In some embodiments, in the above configuration (1), the second section is configured to be rotatable relative to the first section about a central axis of the second section, and the sensor is disposed eccentrically with respect to a central axis of the first section.

With the above configuration (2), when the first section is fixed to the casing so that the central axis of the first section is oriented along the radial direction of the casing, by rotating the second section relative to the first section about the central axis of the second section, it is possible to move the position of the sensor in the axial direction of the casing.

(3) In some embodiments, in the above configuration (1) or (2), the first section includes a first fitting part composed of a circular recess or a circular projection concentric with a central axis of the first section, and the second section includes a second fitting part composed of a circular projection or a circular recess engaged with the recess or the projection of the first fitting part.

With the above configuration (3), the second section can rotate relative to the first section while suppressing positional displacement by the second fitting part relative to the first fitting part in the radial direction with respect to the central axis of the first section.

(4) In some embodiments, in any one of the above configurations (1) to (3), the first section includes a first flange part having a plurality of first hole parts into which a plurality of fastening members are inserted respectively, the second section includes a second flange part having a plurality of second hole parts into which the plurality of fastening members are inserted respectively, the second flange part being connected to the first flange part by the plurality of fastening members. The first flange part and the second flange part are rotatable relative to each other, and at least one of the plurality of first hole parts or the plurality of second hole parts are slotted holes extending along a direction of relative rotation between the first flange part and the second flange part.

With the above configuration (4), since at least one of the plurality of first hole parts or the plurality of second hole parts, into which the fastening members are inserted, are slotted holes, it is possible to fix the second section to the first section at any angular position within the extension range of the slotted holes.

(5) In some embodiments, in any one of the above configurations (1) to (4), the sensor is held by the second section rotatably about a central axis of the sensor parallel to a central axis of the first section.

In the case of using a sensor having an asymmetric structure with respect to the central axis and requiring a predetermined orientation with respect to the rotating blade for measurement, it is desired that the orientation of the sensor is adjustable.

In this regard, with the above configuration (5), it is possible to rotate the sensor such that measurement of the sensor is performed in a predetermined orientation with respect to the blade.

(6) In some embodiments, in any one of the above configurations (1) to (5), the second section includes: a fixation part fixed to the first section rotatably about a central axis concentric with the first section; and a sensor holding part holding the sensor and disposed eccentrically with respect to the central axis of the fixation part so as to be rotatable relative to the fixation part.

With the above configuration (6), when the central axis of the fixation part is oriented along the radial direction of the casing, by rotating the fixation part relative to the first section, the sensor holding part, which is eccentric with respect to the central axis of the fixation part, is moved in the axial direction of the casing. Thus, it is possible to move the sensor in the axial direction of the casing.

Further, by rotating the sensor holding part relative to the fixation part, it is possible to rotate the sensor relative to the casing.

(7) In some embodiments, in any one of the above configurations (1) to (6), the second section is configured to be variable in position in a radial direction of the casing, relative to the first section.

With the above configuration (7), it is possible to change the distance between the radially outer end of the blade and the sensor.

(8) A position adjustment method for a sensor for monitoring a state of a blade of a rotating machine according to at least one embodiment of the present invention, with a first section being fixed to a casing of the rotating machine, and a second section holding the sensor and being supported by the first section, comprises a position adjustment step of changing a positional relationship between the first section and the second section to adjust a position of the sensor in an axial direction of the casing.

With the above method (8), even if the relative position between the blade and the sensor changes in the axial direction of the casing by thermal expansion or the like of the blade or the casing due to temperature increase during operation of the rotating machine, it is possible to change the position of the sensor in the axial direction of the casing.

(9) In some embodiments, in the above method (8), the sensor is held by the second section rotatably about a central axis of the sensor parallel to a central axis of the first section, and the method comprises a rotation step of rotating the sensor about the central axis of the sensor.

With the above method (9), even if the sensor requires a predetermined orientation with respect to the blade for measurement, it is possible to adjust the angular position of the sensor about the central axis such that measurement of the sensor is performed in a predetermined orientation with respect to the blade.

(10) A rotating machine according to at least one embodiment of the present invention comprises: a rotational shaft provided with a plurality of blades; a casing accommodating the rotational shaft; a monitoring sensor for monitoring a state of the plurality of blades, the monitoring sensor being inserted in a through hole of the casing disposed along a radial direction of the casing, a tip of the monitoring sensor protruding to an inner side of the casing; and a sensor protective part attached on an inner peripheral surface of the casing at a position upstream of the through hole with respect to a rotation direction of the blades.

For instance, when dust and droplets are carried by a working fluid, erosion may occur at a tip of a monitoring sensor protruding from the inner peripheral surface of the casing.

In this regard, with the above configuration (10), since the sensor protective part is attached on the inner peripheral surface of the casing at a position upstream of the through hole with respect to the rotation direction of the blades, it is possible to suppress erosion of the monitoring sensor.

Advantageous Effects

According to at least one embodiment of the present invention, it is possible to monitor the state of the blade even if the blade or the casing deforms by thermal expansion or the like.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
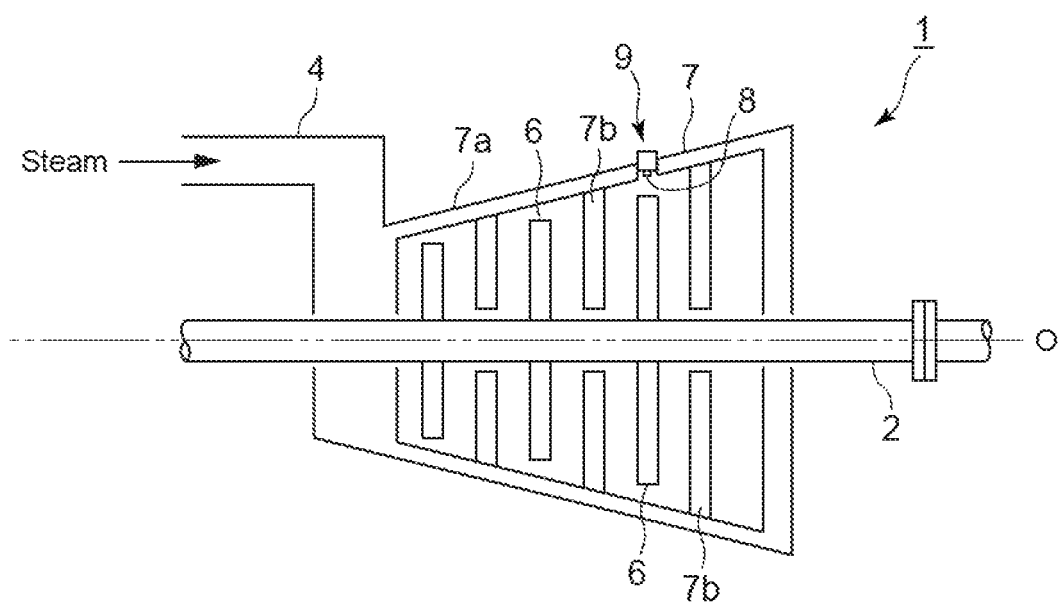
FIG. 1 is a schematic configuration diagram of a steam turbine according to some embodiments.

First, as an example of a rotating machine according to some embodiments, a steam turbine 1 shown in FIG. 1 will be described. FIG. 1 is a schematic configuration diagram of a steam turbine 1 according to some embodiments.

As shown in FIG. 1, the steam turbine 1 according to some embodiments is configured to rotationally drive a rotor (rotational shaft 2) with steam introduced into a casing 7a from a steam inlet 4. In this figure, a steam discharge mechanism such as an exhaust chamber is not depicted.

Specifically, the steam turbine 1 includes a plurality of rotating blades 6 disposed on the rotor 2, and a stator (stationary part) 7 including the casing 7a and a plurality of vanes 7b disposed on the casing 7a.

The rotating blades 6 and the vanes 7b are arranged alternately in a direction of a central axis O of the rotor 2. As steam flowing along the direction of the central axis O of the rotor 2 passes through the rotating blades 6 and the vanes 7b, the rotor 2 rotates, and rotational energy applied to the rotor 2 is taken from the shaft end for applications such as power generation.

In the following description, the direction of the central axis O of the rotor 2 is also referred to as the axial direction of the casing 7a. Further, the radial direction of the rotor 2 is also referred to as the radial direction of the casing 7a or the radial direction of the rotating blade 6.

In a rotating machine such as the steam turbine 1 with the above configuration, it is known that a blade vibrates due to rotation. Therefore, detection of vibration of the blade during operation of the rotating machine is carried out. For instance, for detecting vibration of the rotating blade, multiple sensors may be attached to a casing that faces the radially outer end of the rotating blade to detect vibration of the rotating blade by the sensors.

In some embodiments, the casing 7a facing the radially outer end of the rotating blade 6 is provided with a plurality of monitoring sensors 9 having sensors 8 for detecting vibration of the rotating blade 6.

An example of the vibration detection method for the rotating blade 6 will be schematically described. The details of the monitoring sensor 9 will be described later.

Figure 2:
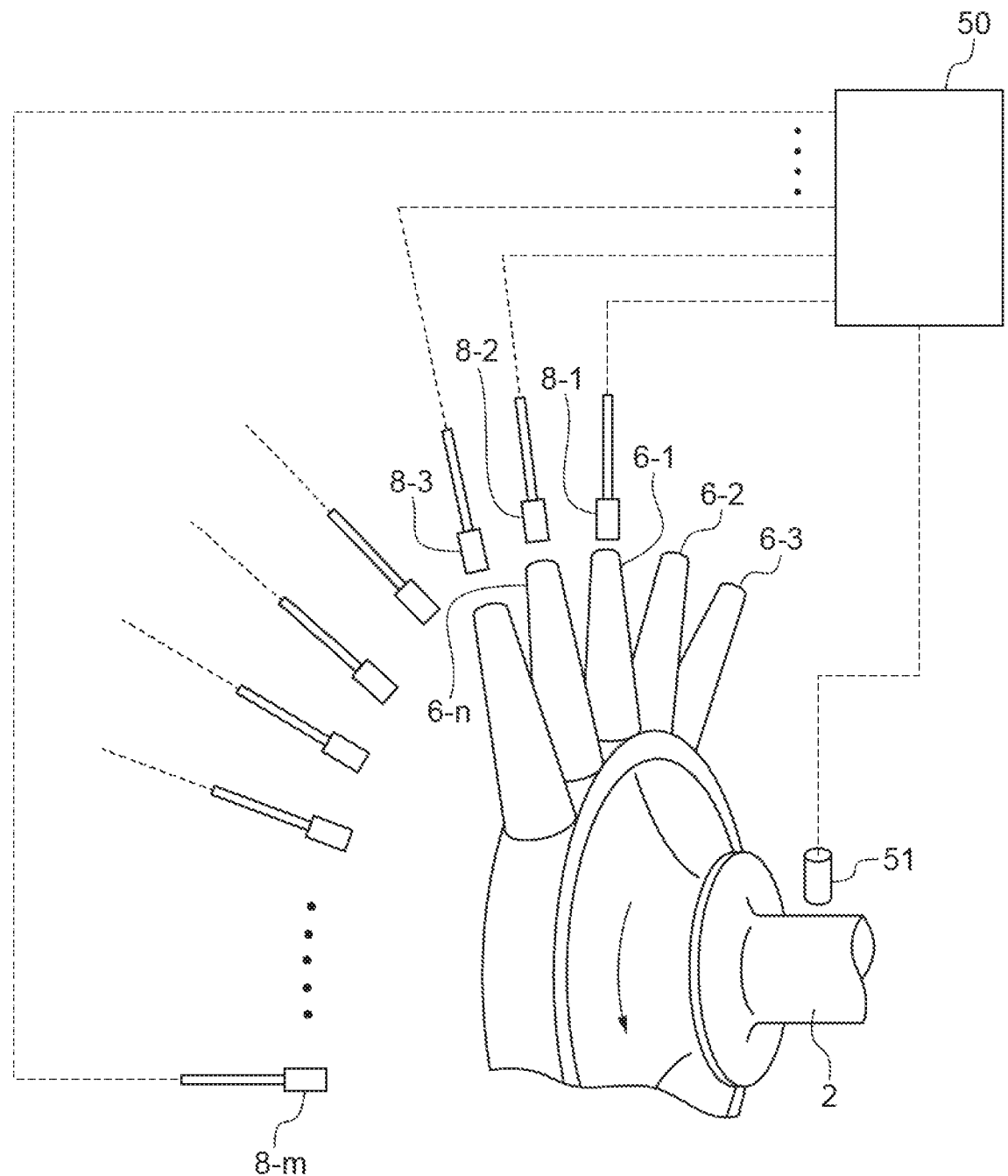
FIG. 2 is a diagram of a configuration for detecting vibration of a rotating blade.

FIG. 2 is a diagram of a configuration for detecting vibration of the rotating blade 6. Around the rotor 2, n rotating blades are attached, including a first rotating blade 6-1, a second rotating blade 6-2, a third rotating blade 6-3, ... and an n-th rotating blade 6-n. At a position facing the radially outer end, i.e., the outer peripheral (distal) end of each rotating blade 6, a sensor 8 for detecting passing of the rotating blade 6 is disposed. For instance, m sensors 8 are arranged on the casing 7a, not shown in FIG. 2, at equal pitches or unequal pitches in the circumferential direction. For instance, the plurality of sensors 8 are referred to as a first sensor 8-1, a second sensor 8-2, a third sensor 8-3, ... and an m-th sensor 8-m in order along the rotation direction of the rotor 2.

Each sensor 8 may be, for example, an electromagnetic sensor, an optical sensor, a capacitance sensor, or an eddy current sensor. As long as passing of the rotating blade 6 can be detected, various sensors may be used as the sensor 8.

A detection signal of each sensor 8 is input to a controller 50, and is processed by the controller 50.

The controller 50 also receives a signal of a rotation detector 51 which is a reference position sensor for detecting zero position (reference position) of the rotor 2.

Figure 3:
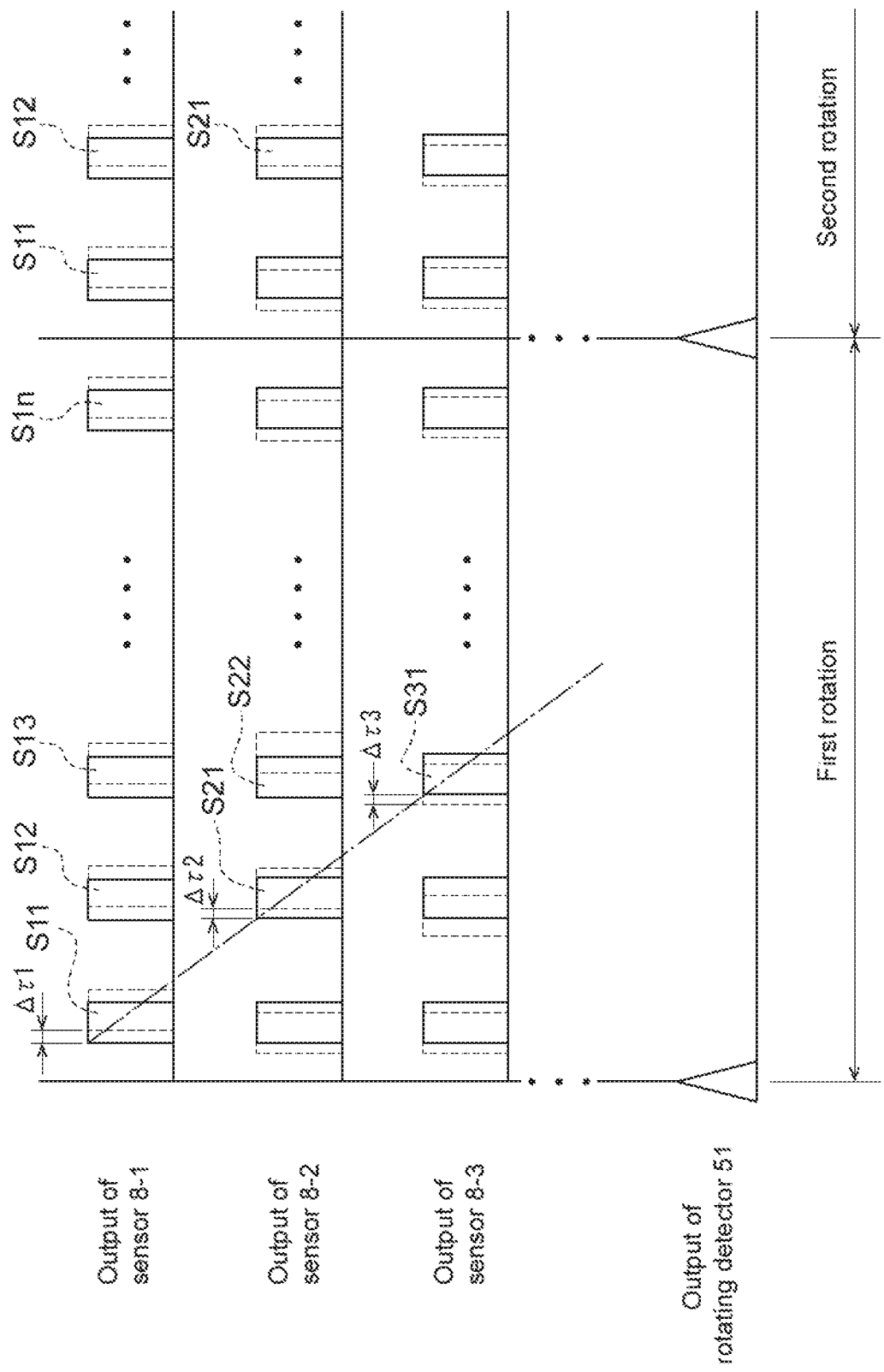
FIG. 3 is a diagram for describing vibration waveform processing for detecting vibration of a rotating blade.

FIG. 3 is a diagram for describing vibration waveform processing for detecting vibration of the rotating blade 6. In FIG. 3, the outputs of the first sensor 8-1, the second sensor 8-2, the third sensor 8-3, ... are shown in order from the top, and the output of the rotation detector 51 is shown at the bottom. The solid line indicates the output from each sensor 8 in a normal state where the rotating blade 6 does not vibrate. The dashed line indicates the output from each sensor 8 in a state (vibrational state) where the rotating blade 6 vibrates.

The first sensor 8-1 outputs a signal S11 caused by passing of the first rotating blade 6-1, a signal S12 caused by passing of the second rotating blade 6-2, a signal S13 caused by passing of the third rotating blade 6-3, ... and so on. The second sensor 8-2 outputs a signal S21 caused by passing of the first rotating blade 6-1, a signal S22 caused by passing of the second rotating blade 6-2, ... and so on. Similarly, the third sensor 8-3 outputs a signal S31 caused by passing of the first rotating blade 6-1, ... and so on.

The controller 50 calculates a first passage timing at which each rotating blade 6 passes through each sensor 8, assuming that the rotating blade 6 does not vibrate. That is, the controller 50 calculates, as the first passage timing, the output timing at which a signal is estimated to be output from each sensor 8 in the normal state, as indicated by the solid line in FIG. 3.

Further, the controller 50 acquires, as a second passage timing, the passage timing of each rotating blade 6 based on a signal actually detected by each sensor 8, as indicated by the dashed line in FIG. 3.

Then, the controller 50 compares the calculated first passage timing and the second timing of each rotating blade 6 actually detected by each sensor 8 to calculate passage time difference $\Delta\tau$.

Specifically, for the first rotating blade 6-1, the controller 50 calculates passage time difference $\Delta\tau1$ of the first rotating blade 6-1 between normal state and vibrational state at the installation position of the first sensor 8-1, passage time difference $\Delta\tau2$ of the first rotating blade 6-1 between normal state and vibrational state at the installation position of the second sensor 8-2, passage time difference $\Delta\tau3$ of the first rotating blade 6-1 between normal state and vibrational state at the installation position of the third sensor 8-3, ... and so on. Similarly, for each of the other rotating blades 6-2 to 6-n, the controller calculates passage time differences $\Delta\tau$ of the rotating blades 6-2 to 6-n between normal state and vibrational state at the installation position of each sensor 8.

The controller 50 determines displacements (amplitudes) $\delta1$-1, $\delta1$-2, $\delta1$-3, ... for the first rotating blade 6-1, based on the calculated passage time difference $\Delta\tau$ and the peripheral speed u of the rotating blade 6.

Figure 4:
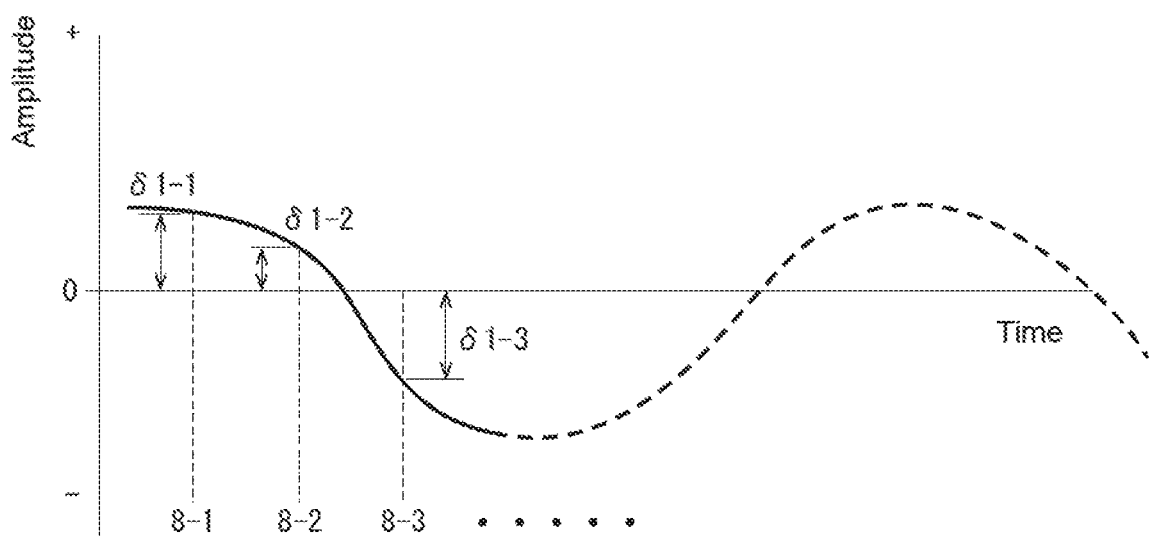
FIG. 4 is a graph showing vibration waveform of a first rotating blade.

The determined amplitudes $\delta 1\text{-}1$, $\delta 1\text{-}2$, $\delta 1\text{-}3$, . . . are plotted against time on the horizontal axis, as shown in FIG. 4, so that the vibration waveform of the first rotating blade 6-1 is obtained. FIG. 4 is a graph showing vibration waveform of the first rotating blade 6-1. That is, the controller 50 acquires vibration waveform of the first rotating blade 6-1 by plotting the calculated amplitudes $\delta 1\text{-}1$, $\delta 1\text{-}2$, $\delta 1\text{-}3$, . . . , against time on the horizontal axis, as shown in FIG. 4.

Similarly, the controller 50 acquires vibration waveforms of the other rotating blades 6-2 to 6-$n$. Further, the controller 50 calculates vibration displacement in an out-of-plane direction of the rotating blade 6 based on the acquired vibration waveforms, and detects the vibrational state (mode of vibration) of the rotating blade 6.

During operation of the rotating machine such as the steam turbine 1, the rotating blade 6 and the casing 7$a$ may deform by thermal expansion due to temperature increase caused by the operation, leading to change in relative position between the rotating blade 6 and the sensor 8. For instance, when the relative position between the rotating blade 6 and the sensor 8 changes in the axial direction of the casing 7$a$, the rotating blade 6 may be out of the detection range of the sensor 8. In particular, when the rotating blade is an integral shroud blade, there may be the following limit to the relative position between the rotating blade and the sensor in the axial direction of the casing.

Figure 5:
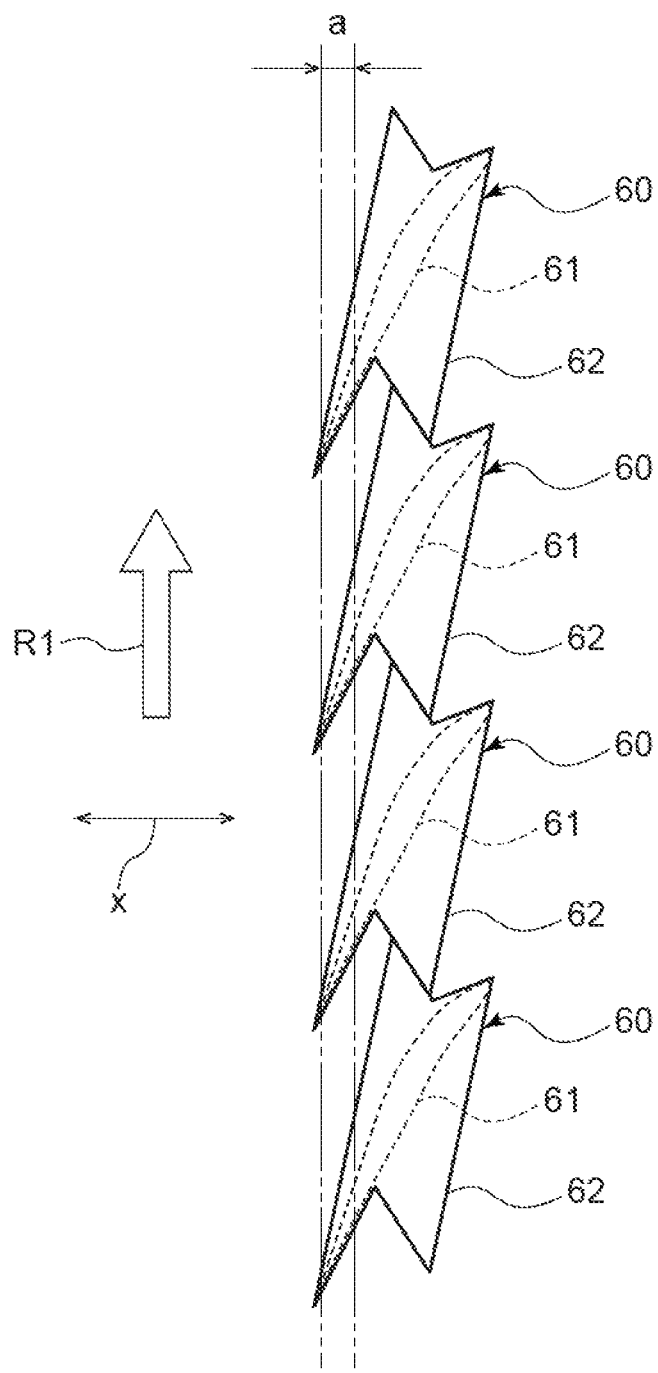
FIG. 5 is a diagram schematically showing a rotating blade row composed of a plurality of integral shroud blades attached to a rotor, as viewed from the radially outer side of the rotating blade.

For instance, the rotating blade called the integral shroud blade has a shroud at the radially outer end of the rotating blade. FIG. 5 is a diagram schematically showing a rotating blade row composed of a plurality of integral shroud blades attached to a rotor, as viewed from the radially outer side of the rotating blade. The integral shroud blade 60 shown in FIG. 6 has an airfoil part 61 having the airfoil and a shroud 62 disposed on the radially outer end of the airfoil part 61. In FIG. 5, the arrow x indicates the axial direction of the casing, and the arrow R1 indicates the rotation direction of the integral shroud blade 60. An end surface of one shroud 62 is in press-contact with an end surface of another shroud 62 of an adjacent integral shroud blade 60.

For instance, the rotating blade row composed of integral shroud blades as shown in FIG. 5 requires that the detection range of the sensor is, for example, substantially within a range "a" between two two-dot chain lines in the axial direction of the casing, in order to separately detect each integral shroud blade 60 by the sensor. For instance, when the position of the sensor in the axial direction of the casing deviates to the left in FIG. 5 from the range "a" between the two two-dot chain lines, the integral shroud blades 60 may be out of the detection range of the sensor. Conversely, for instance, when the position of the sensor in the axial direction of the casing deviates to the right in FIG. 5 from the range "a", since adjacent integral shroud blades 60 are in contact, it may not be possible to separately detect each integral shroud blade 60.

For this reason, in some embodiments, as described later, the monitoring sensor 9 is configured to able to adjust the position of the sensor 8 in the axial direction of the casing 7$a$.

(Monitoring Sensor 9)

Figure 6:
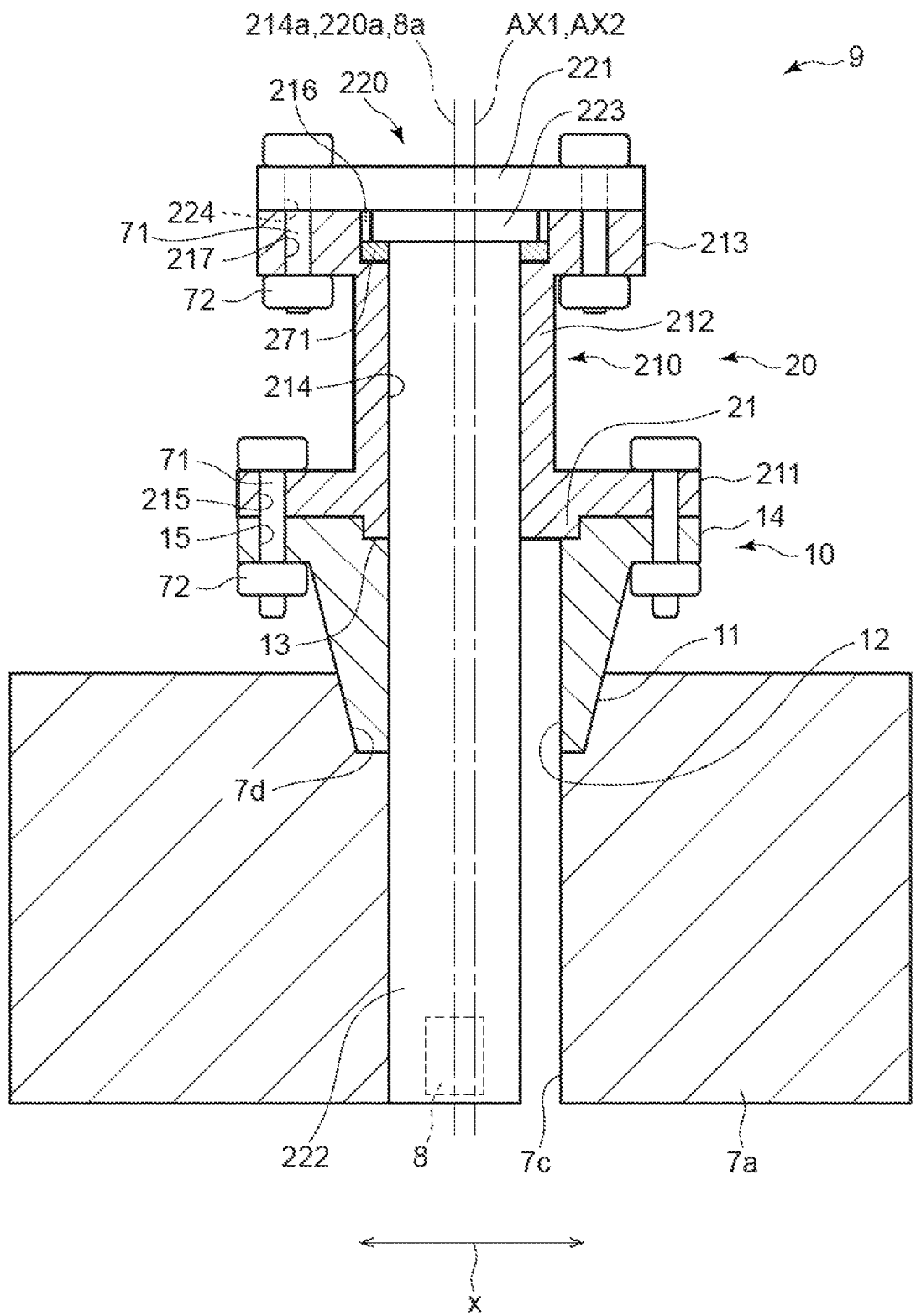
FIG. 6 is a diagram schematically showing a monitoring sensor according to an embodiment, in a cross-section taken along the radial direction of a casing, as viewed from the rotation direction of a rotating blade.
Figure 9:
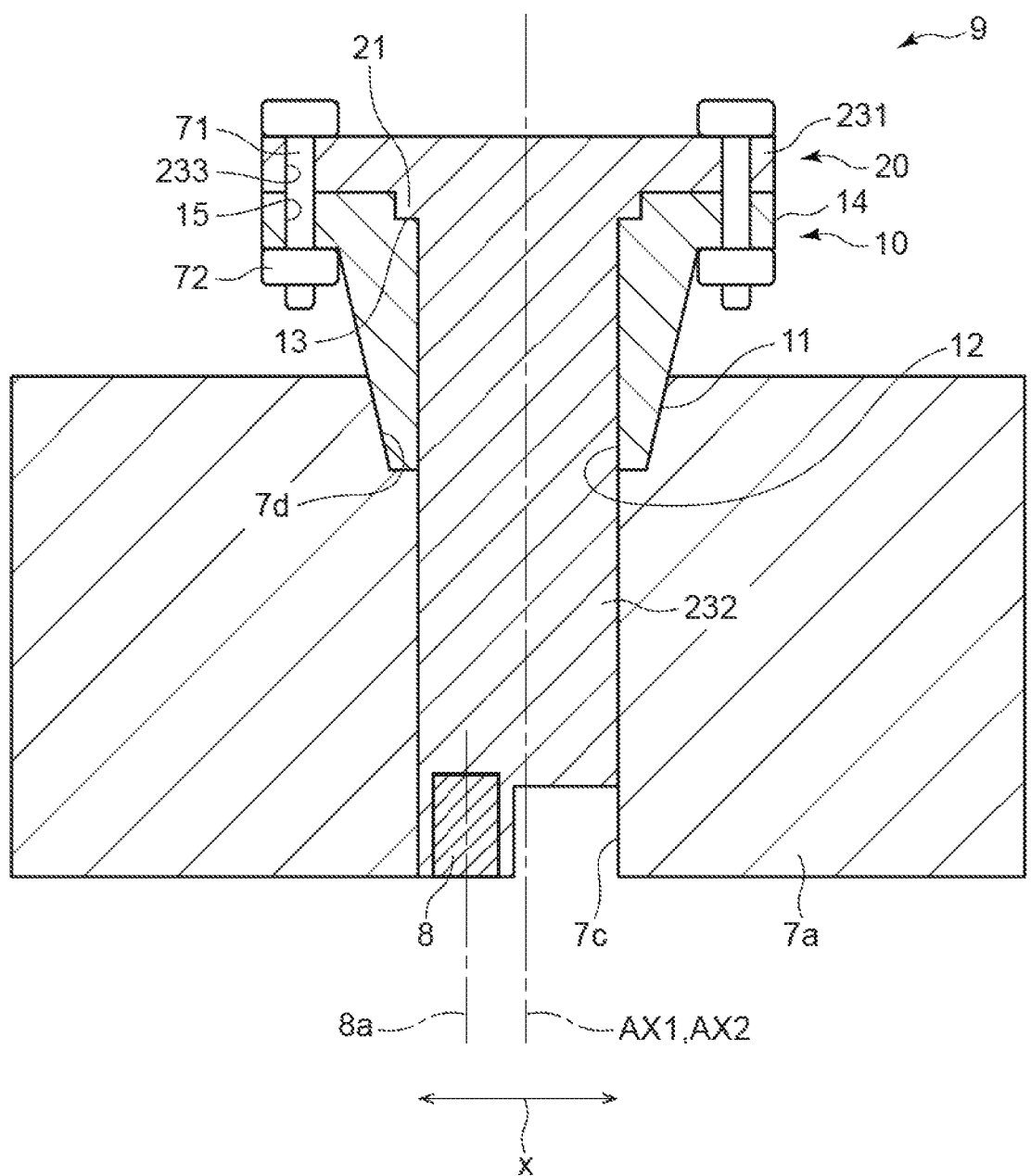
FIG. 9 is a diagram schematically showing a monitoring sensor according to another embodiment, in a cross-section taken along the radial direction of a casing, as viewed from the rotation direction of a rotating blade.

FIG. 6 is a diagram schematically showing the monitoring sensor 9 according to an embodiment, in a cross-section taken along the radial direction of the casing 7$a$, as viewed from the rotation direction of the rotating blade 6. Further, FIG. 9 is a diagram schematically showing the monitoring sensor 9 according to another embodiment, in a cross-section taken along the radial direction of the casing 7$a$, as viewed from the rotation direction of the rotating blade 6. For convenience of description, the illustrated upper direction, which is the radially outer side of the casing 7$a$ in FIGS. 6 and 9 is also simply referred to as upper direction or upper, and the illustrated lower direction which is the radially inner side of the casing 7$a$ in FIGS. 6 and 9 is also simply referred to as lower direction or lower. In FIGS. 6 and 9, the axial direction of the casing 7$a$ is the illustrated right-left direction. In FIGS. 6 and 9, the arrow x indicates the axial direction of the casing 7$a$.

The monitoring sensor 9 according to some embodiments includes a sensor 8 for detecting vibration of the rotating blade 6, i.e., for monitoring the state of the rotating blade 6. The monitoring sensor 9 according to some embodiments includes a first section 10 configured to be fixed to the casing 7$a$. The monitoring sensor 9 according to some embodiments includes a second section 20 holding the sensor 8 and supported by the first section 10 so as to be able to adjust the position of the sensor 8 in the axial direction of the casing 7$a$.

The second section 20 is configured to be rotatable relative to the first section 10 about a central axis AX2 of the second section 20, as described later.

The sensor 8 is disposed eccentrically with respect to a central axis AX1 of the first section 10.

In some embodiments, the casing 7$a$ has multiple through hole parts 7$c$ disposed at positions facing the radially outer end of the rotating blade 6 so that the sensor 8 can face the radially outer end of the rotating blade 6. An inner peripheral surface of the through hole part 7$c$ has a female thread part 7$d$ on the radially outer side of the casing 7$a$, for instance.

(First Section 10)

The first section 10 according to some embodiments has a male thread part 11 to be mated with the female thread part 7$d$ of the casing 7$a$. By mating the male thread part 11 with the female thread part 7$d$ of the casing 7$a$, the first section 10 according to some embodiments is fixed to the casing 7$a$. The method for fixing the first section 10 to the casing 7$a$ is not limited to the above-described fixation method. For instance, the male thread part 11 may be mated with a female thread part of a nozzle provided in the casing 7$a$. Further, instead of mating thread parts, a flange part may be disposed at a lower portion of the first section 10 while another flange part may be disposed at the casing 7$a$, and these flange parts may be connected.

The first section 10 according to some embodiments has a through hole 12 into which a later-described sensor holding part 220, 232 of the second section 20 is inserted. The central axis of the through hole 12 coincides with the central axis AX1 of the first section 10.

The first section 10 according to some embodiments has a first fitting part 13 at an upper portion thereof. The first fitting part 13 is a circular recess recessed downward from the upper surface of the first section 10 and concentric with the central axis AX1 of the first section 10.

Figure 7:
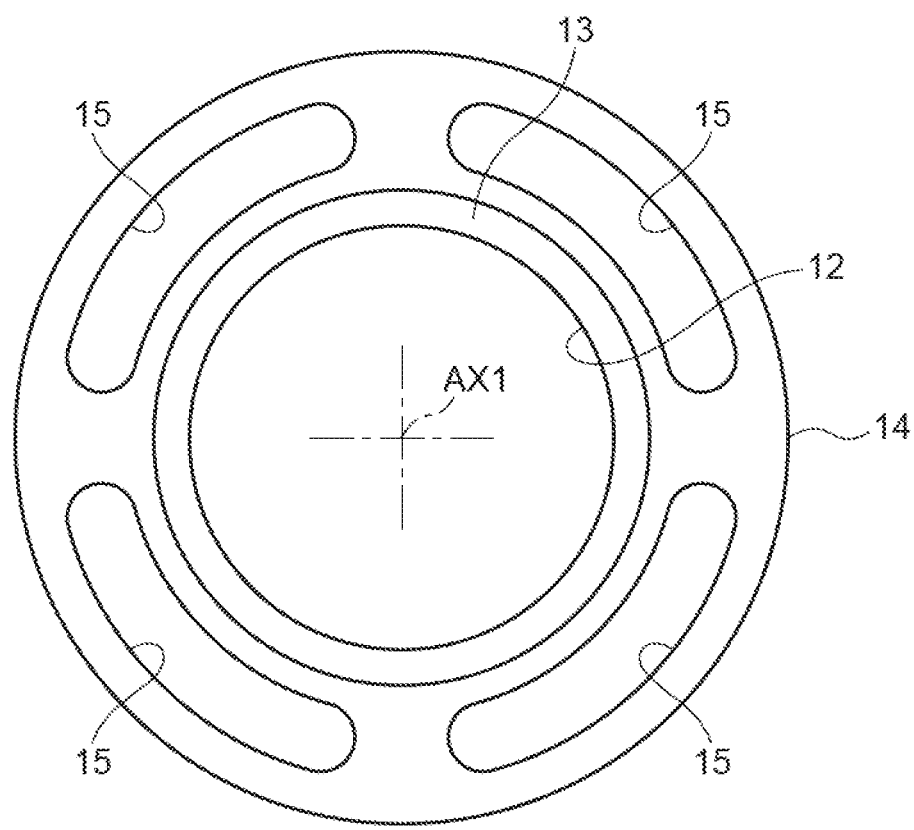
FIG. 7 is a diagram of a first flange part as viewed from the radially outer side of a casing.

The first section 10 according to some embodiments has a first flange part 14 at an upper portion thereof. FIG. 7 is a diagram of the first flange part 14 as viewed from the radially outer side of the casing 7$a$. The first flange part 14 has a plurality of slotted holes 15 disposed outside the first fitting part 13 and extending along the circumferential direction about the central axis AX1.

(Second Section 20)

The second section 20 according to some embodiments is configured to be rotatable relative to the first section 10 about the central axis AX2 of the second section 20, as described below.

The second section 20 according to some embodiments includes a second fitting part 21 composed of a circular projection engaged with the first fitting part 13 of the first section 10. The second fitting part 21 is a circular projection concentric with the central axis AX2 of the second section 20.

The second section 20 according to an embodiment shown in FIG. 6 includes a fixation part 210 and a sensor holding part 220. The second fitting part 21 is disposed at a lower portion of the fixation part 210, as described later. Alternatively, in the second section 20 according to another embodiment shown in FIG. 9, the second fitting part 21 is disposed at a lower portion of the flange part 231, as described later.

First, the second section 20 according to the embodiment shown in FIG. 6 will be described.

The fixation part 210 of the second section 20 according to this embodiment has a lower flange part 211, a middle part 212, and an upper flange part 213. The fixation part 210 has a through hole part 214 extending in the vertical direction. The central axis 214a of the through hole part 214 is eccentric with respect to the central axis AX2 of the second section 20.

The lower flange part 211 is disposed at a lower portion of the fixation part 210, and is flangedly connected to the first flange part 14 of the first section 10. In other words, the lower flange part 211 is a second flange part flangedly connected to the first flange part 14.

The lower surface of the lower flange part (second flange part) 211 has the above-described second fitting part 21. As described above, the second fitting part 21 is a circular projection concentric with the central axis AX2 of the second section 20, and the central axis 214a of the through hole part 214 is eccentric with respect to the central axis AX2 of the second section 20. Accordingly, the through hole part 214 is eccentric with respect to the second fitting part 21.

The lower flange part 211 has a plurality of bolt holes 215 disposed outside the second fitting part 21 and arranged circumferentially about the central axis AX2. The bolt hole 215 is a circular hole and is not a slotted hole extending along the circumferential direction about the central axis AX2 like the slotted hole 15 of the first flange part 14 shown in FIG. 7, but may be a slotted hole extending along the circumferential direction about the central axis AX2.

The middle part 212 is a hollow axial portion connecting the lower flange part 211 and the upper flange part 213 and has an inner peripheral surface forming the through hole part 214.

The upper flange part 213 is a disc-shaped flange part concentric with the central axis 214a of the through hole part 214. The upper flange part 213 has a recess 216 recessed downward from the upper surface of the upper flange part 213. The recess 216 receives a spacer 271 for adjusting the position of the sensor 8 in the radial direction of the casing, as described later.

The upper flange part 213 has a plurality of bolt holes 217 disposed outside the recess 216 and arranged circumferentially about the central axis 214a of the through hole part 214. The bolt hole 217 is a circular hole like the bolt hole 215 of the lower flange part 211, and is not a slotted hole extending along the circumferential direction about the central axis AX2 like the slotted hole 15 of the first flange part 14 shown in FIG. 7, but may be a slotted hole extending along the circumferential direction about the central axis AX2.

The sensor holding part 220 of the second section 20 according to an embodiment has a flange part 221, a shaft part 222, and a step part 223.

The flange part 221 is a flange part flangedly connected to the upper flange part 213 of the fixation part 210. The flange part 221 has a plurality of slotted holes 224 extending in the circumferential direction about the central axis 220a of the sensor holding part 220, like the slotted hole 15 of the first flange part 14 shown in FIG. 7.

The shaft part 222 is an axial portion extending downward from the flange part 221 and concentric with the central axis 220a of the sensor holding part 220. A lower end portion of the shaft part 222 holds the sensor 8. The sensor 8 is held by the shaft part 222 so that the central axis 8a of the sensor 8 is concentric with the central axis 220a of the sensor holding part 220. The shaft part 22 is inserted into the through hole part 214 of the fixation part 210 and the through hole 12 of the first section 10, and further inserted into the through hole part 7c of the casing 7a. When the shaft part 222 is inserted in the through hole part 214 of the fixation part 210, the central axis 220a of the sensor holding part 220 is concentric with the central axis 214a of the through hole part 214.

In FIG. 6, the lower end of the shaft part 222 and the inner peripheral surface of the casing 7a are in substantially the same position in the radial direction of the casing 7a. However, the lower end of the shaft part 222 may protrude from the inner peripheral surface of the casing 7a to the radially inner side of the casing 7a, or may be recessed from the inner peripheral surface of the casing 7a to the radially outer side of the casing 7a.

The step part 223 is a stepped portion disposed above the shaft part 22 and having a diameter greater than the shaft part 222. As described below, when the sensor holding part 220 is attached to the fixation part 210, a spacer 271 is placed between the upper surface of the recess 216 of the fixation part 210 and the lower surface of the step part 223.

Next, the second section 20 according to another embodiment shown in FIG. 9 will be described. The second section 20 according to the embodiment shown in FIG. 9 has a flange part 231, a second fitting part 21, and a sensor holding part 232. The flange part 231, the second fitting part 21, and the sensor holding part 232 are disposed concentrically with the central axis AX2 of the second section 20.

The flange part 231 is a flange part flangedly connected to the first flange part 14 of the first section 10. In other words, the flange part 231 is a second flange part flangedly connected to the first flange part 14.

The flange part (second flange part) 231 has a plurality of bolt holes 233 arranged circumferentially about the central axis AX2 of the second section 20. The bolt hole 233 is a circular hole and is not a slotted hole extending along the circumferential direction about the central axis AX2 like the slotted hole 15 of the first flange part 14 shown in FIG. 7, but may be a slotted hole extending along the circumferential direction about the central axis AX2.

In the second section 20 according to this embodiment, the second fitting part 21 is disposed at a lower portion of the flange part 231.

The sensor holding part 232 is an axial portion extending downward from the second fitting part 21 and concentric with the central axis AX2 of the second section 20, as described above. A lower end portion of the sensor holding part 232 holds the sensor 8. The sensor 8 is held by the sensor holding part 232 so that the central axis 8a of the sensor 8 is eccentric with respect to the central axis AX2 of the second section 20. The sensor holding part 232 is inserted into the through hole 12 of the first section 10, and further inserted into the through hole part 7c of the casing 7a.

In FIG. 9, the lower end of the sensor holding part 232 and the inner peripheral surface of the casing 7a are in substantially the same position in the radial direction of the casing 7a. However, the lower end of the sensor holding part 232 may protrude from the inner peripheral surface of the casing 7a to the radially inner side of the casing 7a, or may be recessed from the inner peripheral surface of the casing 7a to the radially outer side of the casing 7a.

The parts of the monitoring sensor 9 according to some embodiments with the above configuration are assembled as follows.

In the monitoring sensor 9 according to the embodiment shown in FIG. 6, the first fitting part 13 of the first section 10 fixed to the casing 7a and the second fitting part 21 of the fixation part 210 of the second section 20 are fitted together. The first flange part 14 of the first section 10 and the lower flange part 211 of the fixation part 210 are connected by securing a bolt 71 inserted in the slotted hole 15 and the bolt hole 215 with a nut 72. Thus, the fixation part 210 is fixed to the first section 10.

In the monitoring sensor 9 according to the embodiment shown in FIG. 6, the sensor holding part 220 is fixed to the fixation part 210. More specifically, the upper flange part 213 of the fixation part 210 and the flange part 221 of the sensor holding part 220 are connected by securing a bolt 71 inserted in the bolt hole 217 and the slotted hole 224 with a nut 72. As described above, the recess 216 of the fixation part 210 receives the spacer 271, and the spacer 271 is clamped between the upper surface of the recess 216 and the lower surface of the step part 223 of the sensor holding part 220. In the monitoring sensor 9 according to an embodiment, the sensor holding part 220 of the second section 20 is configured to be variable in position in the radial direction of the casing 7a relative to the first section 10. In other words, by changing the thickness of the spacer 271, the position of the sensor 8 in the radial direction of the casing 7a can be adjusted, so that the distance between the radial outer end of the rotating blade 6 and the sensor 8 can be changed.

In the monitoring sensor 9 according to the embodiment shown in FIG. 9, the first fitting part 13 of the first section 10 fixed to the casing 7a and the second fitting part 21 of the second section 20 are fitted together. The first flange part 14 of the first section 10 and the flange part 231 of the second section 20 are connected by securing a bolt 71 inserted in the slotted hole 15 and the bolt hole 233 with a nut 72. Thus, the second section 20 is fixed to the first section 10.

Next, a description will be given with respect to the monitoring sensor 9 according to the embodiment shown in FIG. 6 having the configuration capable of adjusting the position of the sensor 8 in the axial direction of the casing 7a.

In the monitoring sensor 9 according to the embodiment shown in FIG. 6, the fixation part 210 is fixed to the first section 10 so as to be rotatable about the central axis concentric with the first section 10. Specifically, it is as follows:

The central axis AX2 of the second section 20 according to an embodiment is the central axis of the fixation part 210 and is concentric with the central axis AX1 of the first section 10 as described above.

However, as described above, the central axis 214a of the through hole part 214 is eccentric with respect to the central axis AX2 of the second section 20. Accordingly, the central axis 214a of the through hole part 214 is eccentric with respect to the central axis AX1 of the first section 10.

As a result, when the fixation part 210 rotates relative to the first section 10 about the central axis AX1 (about the central axis AX2) while the first fitting part 13 of the first section 10 and the second fitting part 21 of the fixation part 210 are fitted together, the central axis 214a of the through hole part 214 moves in the circumferential direction about the central axis AX1. As described above, the shaft part 222 of the sensor holding part 220 is inserted in the through hole part 214, and the sensor 8 is held by the shaft part 22. Accordingly, as the fixation part 210 rotates about the central axis AX1 relative to the first section 10, the sensor 8 moves in the circumferential direction about the central axis AX1. Thus, by moving the sensor 8 in the circumferential direction about the central axis AX1, it is possible to adjust the position of the sensor 8 in the axial direction of the casing 7a.

Thus, the sensor position adjustment method using the monitoring sensor 9 according to an embodiment includes a position adjustment step of changing a positional relationship between the first section 10 and the second section 20 to adjust the position of the sensor 8 in the axial direction of the casing 7a. In the sensor position adjustment method using the monitoring sensor 9 according to an embodiment, changing the position relationship between the first section 10 and the second section 20 involves rotating the fixation part 210 relative to the first section 10.

Figure 8:
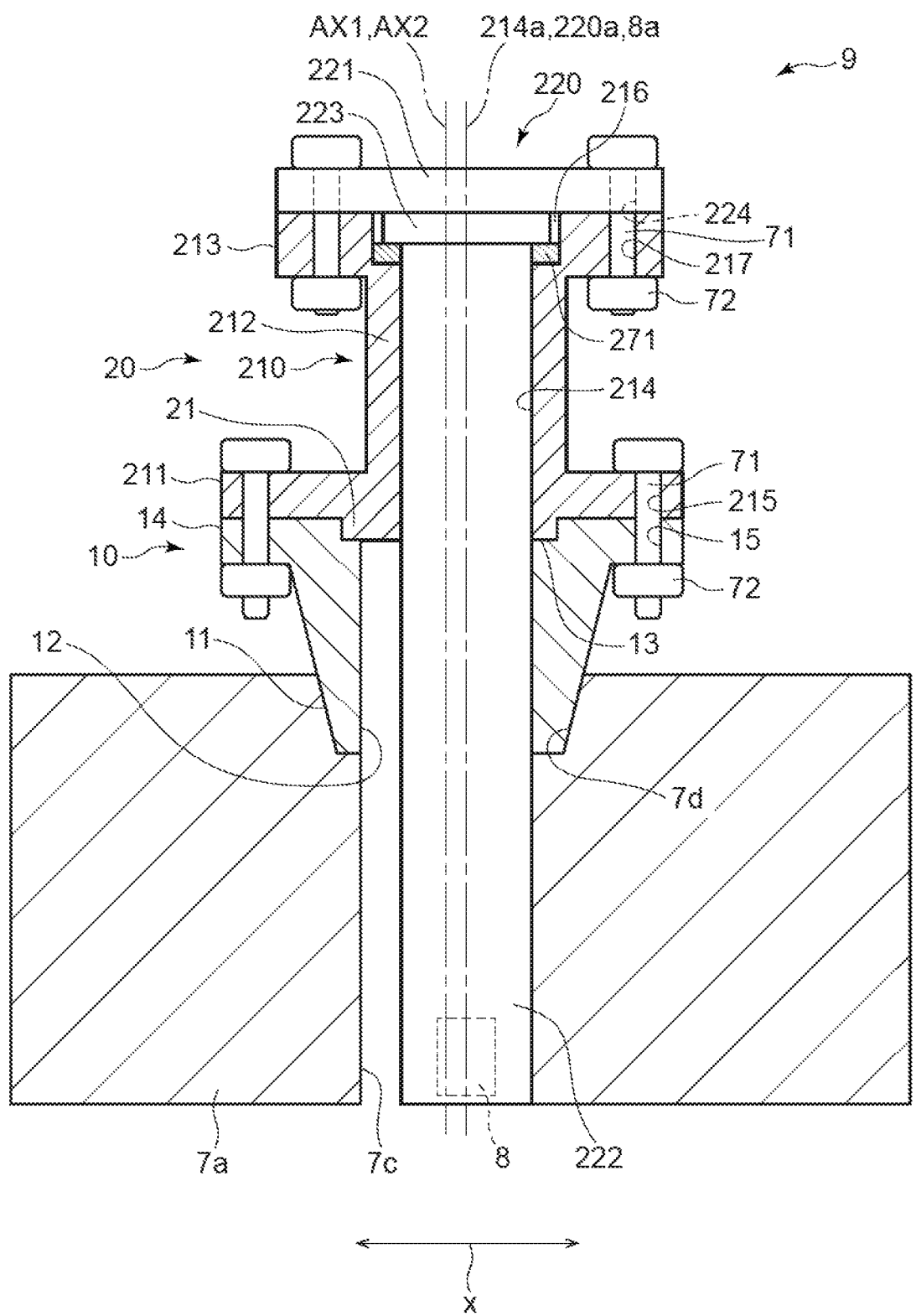
FIG. 8 is a diagram showing an exemplary case where the angular position of a fixation part with respect to a first section is different from that shown in FIG. 6.

FIG. 8 is a diagram showing an exemplary case where the angular position of the fixation part 210 with respect to the first section 10 is different from that shown in FIG. 6. As is apparent from comparison between FIG. 6 and FIG. 8, the position of the sensor 8 in the axial direction of the casing 7a is displaced to the right side in FIG. 8 compared to FIG. 6.

That is, in the monitoring sensor 9 according to an embodiment, by rotating the fixation part 210 relative to the first section 10, the sensor holding part 220, which is eccentric with respect to the central axis AX2 of the second section 20, i.e., the central axis of the fixation part 210, is moved in the axial direction of the casing 7a. Thus, it is possible to move the sensor 8 in the axial direction of the casing 7a.

Here, since the bolt hole of the first flange part 14 is a plurality of slotted holes 15, the first flange part 14 and the lower flange part (second flange part) 211 can be rotated relative to each other within a range of extension of the slotted holes 15 in the circumferential direction about the central axis AX1. Thus, in the monitoring sensor according to an embodiment, since the slotted holes 15 extend along the direction of relative rotation of the first flange part 14 and the lower flange part (second flange part) 211, it is possible to fix the second section 20 to the first section 10 at any angular position within the extension range of the slotted holes 15.

In the monitoring sensor 9 according to the embodiment shown in FIG. 6, the sensor holding part 220 is rotatable relative to the fixation part 210 about the central axis 214a of the through hole part 214 (the central axis 220a of the sensor holding part 220). In other words, the sensor 8 is held by the second section 20 rotatably about the central axis of the sensor 8 parallel to the central axis AX1 of the first section 10. Further, the sensor holding part 220 holds the sensor 8 and is disposed eccentrically with respect to the central axis AX2 of the fixation part 210 so as to be rotatable relative to the fixation part 210.

Consequently, the monitoring sensor 9 according to the embodiment shown in FIG. 6 enables adjustment of the angular position of the sensor 8 about the central axis of the sensor 8, regardless of the position of the sensor 8 in the axial direction of the casing 7a.

Thus, the sensor position adjustment method using the monitoring sensor 9 according to an embodiment includes a rotation step of rotating the sensor 8 about the central axis of the sensor 8.

Figure 11:
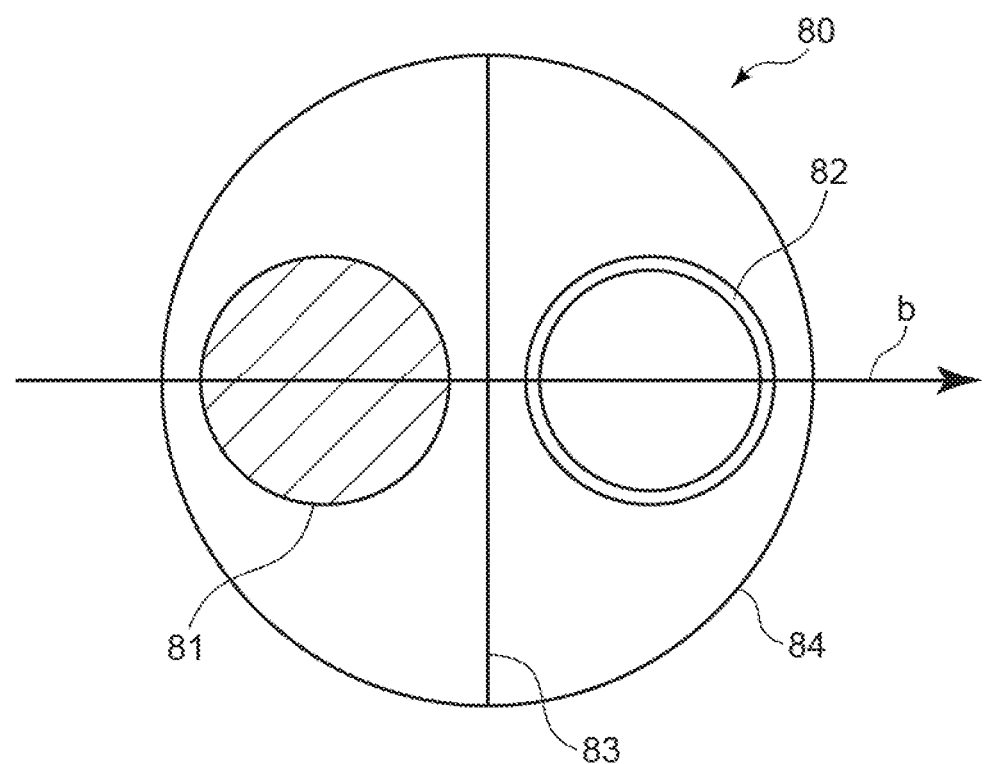
FIG. 11 is a schematic configuration diagram of an electromagnetic pickup sensor as an example of a sensor having an asymmetric structure with respect to the central axis, as viewed along the central axis.

This provides the following effects:

For instance, a sensor that can be used as the sensor 8 includes a sensor having an asymmetric structure with respect to the central axis and requiring a predetermined orientation with respect to the rotating blade 6 for measurement. Examples of such a sensor includes an electromagnetic pickup sensor, in which a permanent magnet and a detection coil are arranged side by side via a partition wall, as shown in FIG. 11. The electromagnetic pickup sensor detects changes in the magnetic field formed by the permanent magnet using the detection coil. FIG. 11 is a schematic configuration diagram of an electromagnetic pickup sensor as an example of the sensor having an asymmetric structure with respect to the central axis, as viewed along the central axis.

In an asymmetric sensor 80 shown in FIG. 11, when viewed along the central axis of the asymmetric sensor 80, a permanent magnet 81 and a detection coil 82 are arranged side by side via a partition wall 83 inside a protective member 84.

As an example, the following case will be described: the asymmetric sensor 80 is used as the sensor 8 according to some embodiments, and the asymmetric sensor 80 is disposed such that the central axis of the asymmetric sensor 80 is oriented along the radial direction of the casing 7a. In this case, when the asymmetric sensor 80 is oriented so that the rotating blade 6 first approaches the permanent magnet 81 and then approaches the detection coil 82 as shown by the arrow b in FIG. 11, the detection sensitivity of the asymmetric sensor 80 for the rotating blade 6 is the highest. Therefore, in the case where the asymmetric sensor 80 is used as the sensor 8 according to some embodiments, it is desirable that the monitoring sensor 9 is configured so that the orientation of the asymmetric sensor 80 can be changed.

In this regard, as described above, since the monitoring sensor 9 according to an embodiment can adjust the angular position of the sensor 8 about the central axis of the sensor 8, when the asymmetric sensor 80 is used as the sensor 8, the asymmetric sensor 80 can rotate such that measurement of the asymmetric sensor 80 is performed in a predetermined orientation with respect to the rotating blade 6.

Next, a description will be given with respect to the monitoring sensor 9 according to another embodiment shown in FIG. 9 having the configuration capable of adjusting the position of the sensor 8 in the axial direction of the casing 7a.

In the second section 20 according to the embodiment shown in FIG. 9, the central axis AX2 of the second section 20 is concentric with the central axis AX1 of the first section 10 as described above. Further, as described above, in the second section 20 according to this embodiment, the central axis 8a of the sensor 8 is eccentric with respect to the central axis AX2 of the second section 20.

As a result, when the second section 20 rotates relative to the first section 10 about the central axis AX1 (about the central axis AX2) while the first fitting part 13 of the first section 10 and the second fitting part 21 of the second section 20 are fitted together, the central axis 8a of the sensor 8, i.e., the sensor 8 moves in the circumferential direction about the central axis AX1. Thus, by moving the sensor 8 in the circumferential direction about the central axis AX1, it is possible to adjust the position of the sensor 8 in the axial direction of the casing 7a.

Figure 10:
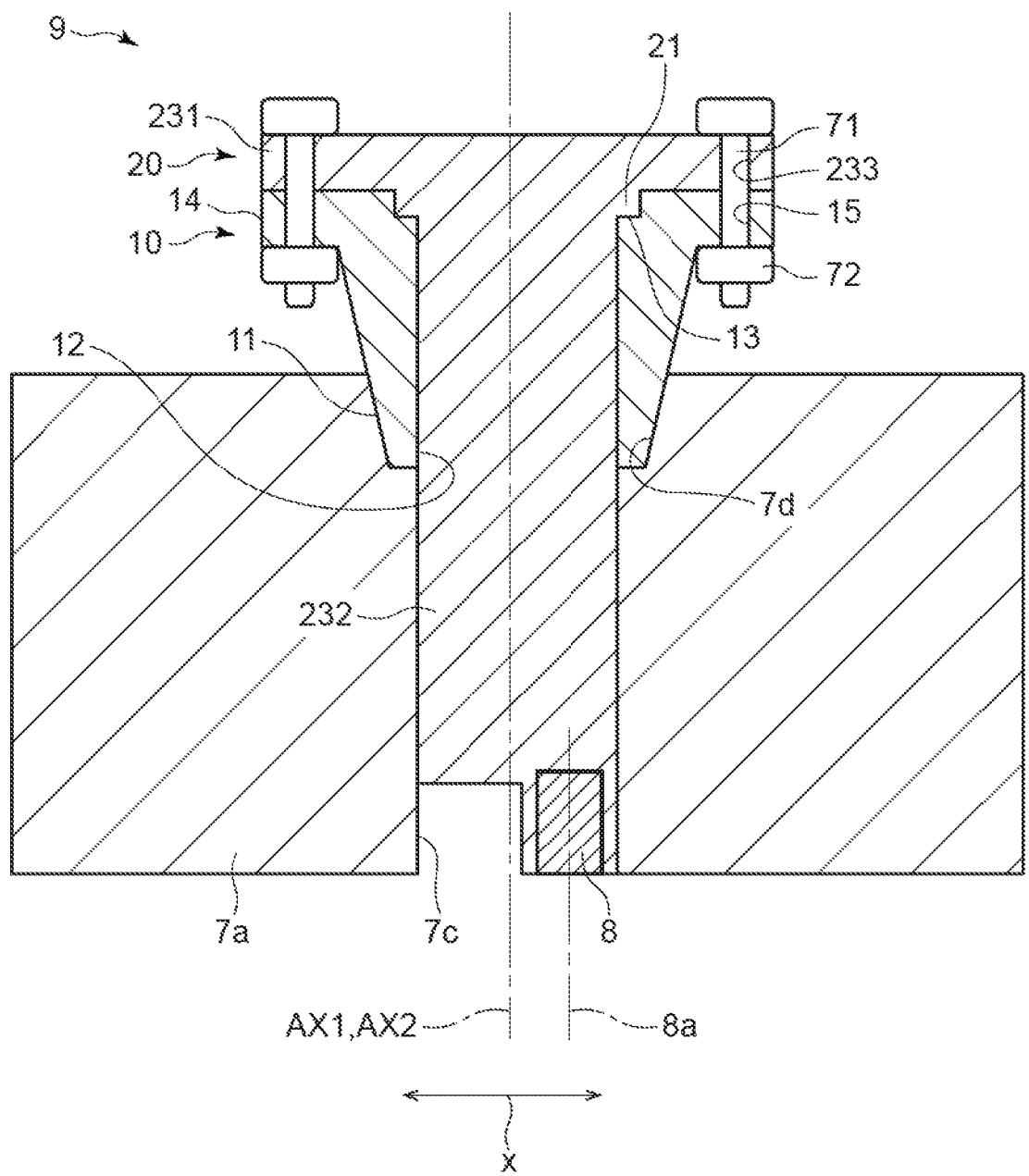
FIG. 10 is a diagram showing an exemplary case where the angular position of a second section with respect to a first section is different from that shown in FIG. 9.

FIG. 10 is a diagram showing an exemplary case where the angular position of the second section 20 with respect to the first section 10 is different from that shown in FIG. 9. As is apparent from comparison between FIG. 9 and FIG. 10, the position of the sensor 8 in the axial direction of the casing 7a is displaced to the right side in FIG. 10 compared to FIG. 9.

Here, as with the monitoring sensor 9 according to the embodiment shown in FIG. 6, since the bolt hole of the first flange part 14 of the monitoring sensor 9 according to the embodiment shown in FIG. 9 is a plurality of slotted holes 15, the first flange part 14 and the lower flange part (second flange part) 231 can be rotated and connected to each other within a range of extension of the slotted holes 15 in the circumferential direction about the central axis AX1.

Thus, as described above, the monitoring sensor 9 according to some embodiments includes the sensor 8 for monitoring the state of the rotating blade 6, the first section 10 configured to be fixed to the casing 7a, and the second section 20 holding the sensor 8. The second section 20 is supported by the first section 10 so as to be able to adjust the position of the sensor 8 in the axial direction of the casing 7a.

Thus, even if the relative position between the rotating blade 6 and the sensor 8 changes in the axial direction of the casing 7a by thermal expansion or the like due to temperature increase during operation of the steam turbine 1, since the position of the sensor 8 can be changed in the axial direction of the casing 7a, it is possible to monitor the state of the rotating blade 6.

Further, as described above, in the monitoring sensor 9 according to some embodiments, the second section 20 is configured to be rotatable relative to the first section 10 about the central axis AX2 of the second section 20, and the sensor 8 is disposed eccentrically with respect to the central axis AX1 of the first section 10. Thus, by rotating the second section 20 relative to the first section 10 about the central axis AX2 of the second section 20, it is possible to move the position of the sensor 8 in the axial direction of the casing 7a.

In the monitoring sensor 9 according to some embodiments, as described above, the first section 10 includes the first fitting part 13 composed of a circular recess concentric with the central axis AX1. Further, the second section 20 includes the second fitting part 21 composed of a circular projection engaged with the recess of the first fitting part 13.

Thus, the second section 20 can rotate relative to the first section 10 while suppressing positional displacement by the second fitting part 21 relative to the first fitting part 13 in the radial direction with respect to the central axis AX1 of the first section 10.

(Erosion Measure of Monitoring Sensor 9)

When dust and droplets are carried by a working fluid of a rotating machine, erosion may occur at a tip of a monitoring sensor protruding from the inner peripheral surface of the casing.

For instance, in the steam turbine 1, steam of working fluid is condensed into drain.

Figure 12A:
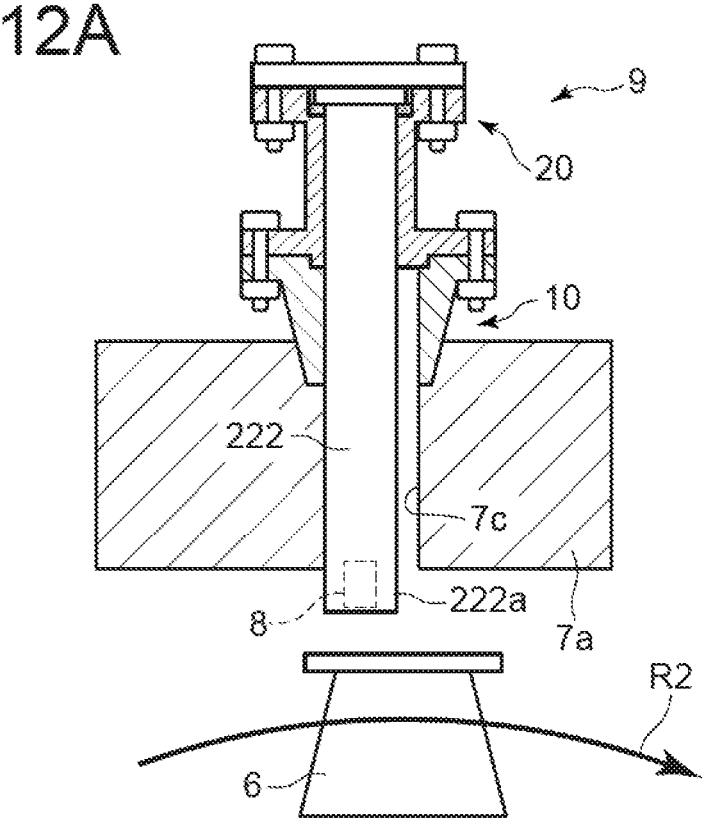
FIG. 12A is a diagram schematically showing a monitoring sensor according to an embodiment, for describing erosion measure of a monitoring sensor 9, in a cross-section taken along the radial direction of a casing, as viewed along the axial direction of the casing.

FIG. 12A is a diagram schematically showing the monitoring sensor 9 according to an embodiment, in a cross-section taken along the radial direction of the casing 7a, as viewed along the axial direction of the casing. In FIG. 12A, the arrow R2 indicates the rotation direction of the rotating blade 6. For instance, as shown in FIG. 12A, when the lower end of the shaft part 222 of the monitoring sensor 9 protrudes from the inner peripheral surface of the casing 7a to the radially inner side of the casing 7a, drain is carried along the rotation direction of the rotating blade 6, and impinges on a protruding portion 222a of the shaft part 222 protruding from the inner peripheral surface of the casing 7a from upstream with respect to the rotation direction of the rotating blade 6. Accordingly, erosion may occur at the protruding portion 222a on the upstream side with respect to the rotation direction of the rotating blade 6.

Figure 12B:
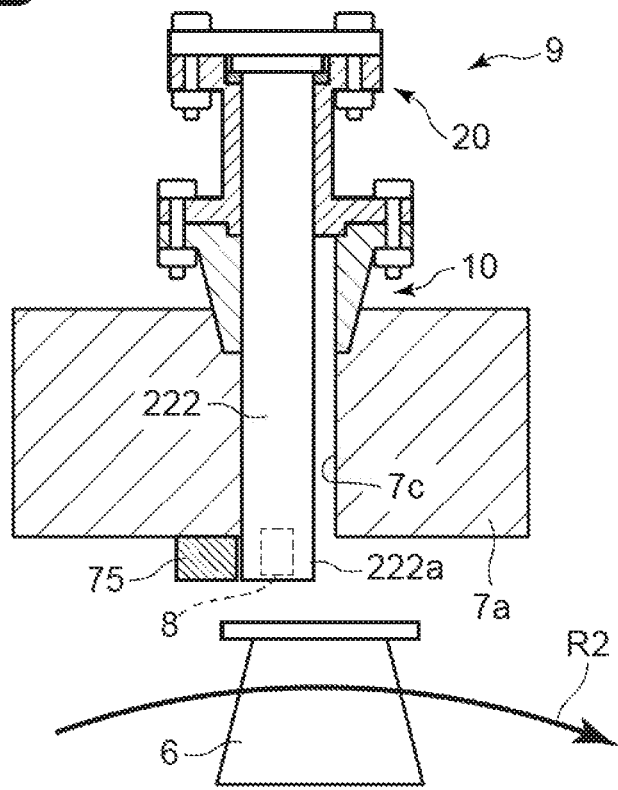
FIG. 12B is a diagram schematically showing a monitoring sensor according to an embodiment, for describing erosion measure of a monitoring sensor 9, where a sensor protective part is provided.

Therefore, in some embodiments, as shown in FIG. 12B, a sensor protective part 75 is attached on the inner peripheral surface of the casing 7a at a position upstream of the through hole part 7c with respect to the rotation direction of the rotating blade 6. This prevents drain or the like carried from upstream with respect to the rotation direction of the rotating blade 6 from impinging on the protruding portion 222a, thus suppressing erosion of the shaft part 222. FIG. 12B is the same as FIG. 12A except that the sensor protective part 75 is provided.

As the sensor protective part 75 has a shape and a size such that the sensor protective part 75 covers the protruding portion 222a when viewed from upstream in the rotation direction of the rotating blade 6, the erosion suppression effect increases.

The material of the sensor protective part 75 may be metal or ceramic. If it is not desirable that the material of sensor protective part 75 is metal, for instance, since the sensor 8 is an eddy current sensor, the material of the sensor protective part 75 may be a non-metallic material such as ceramic.

The present invention is not limited to the embodiments described above, but includes modifications to the embodiments described above, and embodiments composed of combinations of those embodiments.

For instance, in the above embodiments, the bolt holes of the first flange part 14 are the slotted holes 15 so that the second section 20 can be fixed to the first section 10 at any angular position. However, the bolt holes of the first flange part 14 may be circular holes, not the slotted holes 15. Even in this case, it is possible to change the angular position of the second section 20 with respect to the first section 10 by pitch unit of the bolt holes. For instance, when the bolt holes of the first flange part 14 are arranged circumferentially at a 30-degree pitch, the angle position of the second section 20 with respect to the first section 10 can be changed by the 30-degree pitch.

The same applies to the slotted holes 224 of the flange part 221 of the sensor holding part 220.

In the above embodiments, the second section 20 is configured to be rotatable relative to the first section 10 about the central axis AX2 of the second section 20, i.e., about the central axis AX1 of the first section 10. Further, the sensor 8 is disposed eccentrically with respect to the central axis AX1 of the first section 10, so that it is possible to adjust the position of the sensor 8 in the axial direction of the casing 7a by rotating the second section 20 relative to the first section 10. However, the configuration to adjust the position of the sensor 8 in the axial direction of the casing 7a is not limited thereto.

For instance, the through hole 12 of the first section 10 when viewed along the central axis AX1 may be formed in a slotted shape extending along the axial direction of the casing 7a. Further, the first section 10 and the second section 20 may be fixed while the shaft part 222 and the sensor holding part 232 of the second section 20 are moved into any position in the through hole 12 in the axial direction of the casing 7a.

Figure 13:
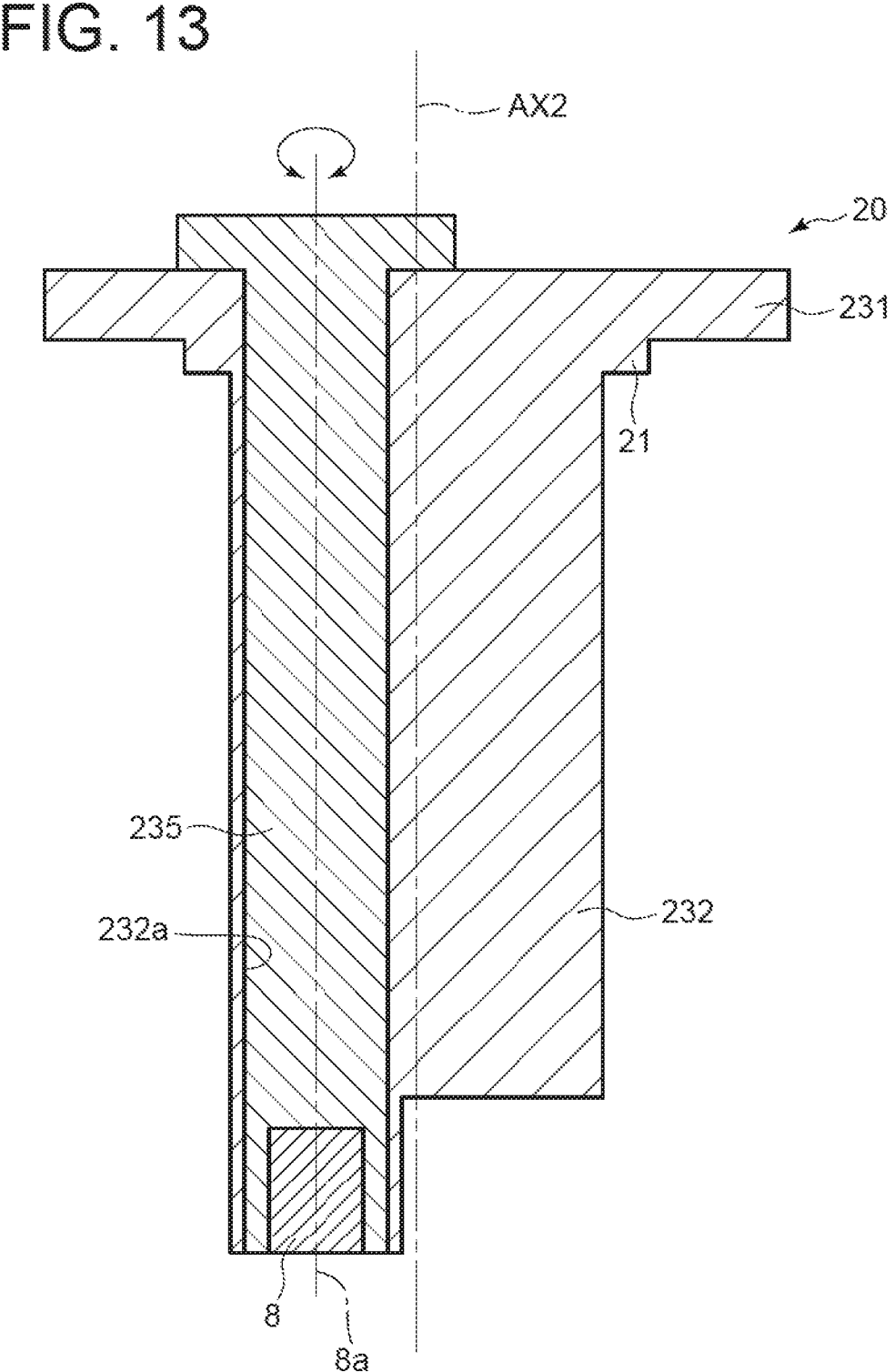
FIG. 13 is a cross-sectional view of a second section according to a modified example.

In the other embodiment described above, the sensor 8 cannot rotate relative to the second section 20 about the central axis 8a of the sensor 8. Alternatively, for instance, as shown in FIG. 13, a hole part 232a extending parallel to the central axis AX2 may be provided in the sensor holding part 232, and a shaft part 235 may be inserted in the hole part 232a. The sensor 8 may be held by a lower end portion of the shaft part 235.

By rotating the shaft part 235 about the central axis of the shaft part 235 parallel to the central axis AX2 inside the hole part 232a, it is possible to rotate the sensor 8 about the central axis 8a relative to the second section 20. The central axis of the shaft part 235 may coincide with the central axis 8a of the sensor 8, for instance. FIG. 13 is a cross-sectional view of the second section 20 according to a modified example.

In the above embodiments, the monitoring sensor 9 is provided for detecting vibration of the rotating blade 6. However, the configuration pertaining to the monitoring sensor 9 in some embodiments may be applied to a monitoring sensor for detecting vibration of the vane 7b.

Moreover, the application of the monitoring sensor 9 is not limited to vibration detection of the rotating blade 6, but the monitoring sensor 9 according to some embodiments may be used to detect a tip clearance, which is a clearance between the radially outer end of the rotating blade 6 and the inner peripheral surface of the casing 7a.

In the monitoring sensor 9 according to the embodiment described above, the spacer 271 adjusts the relative position between the sensor holding part 220 and the fixation part 210 to adjust the position of the sensor 8 in the radial direction of the casing 7a. However, the spacer 271 may be configured to adjust the relative position between the fixation part 210 and the first section 10. This configuration also enables adjustment of the position of the sensor 8 in the radial direction of the casing 7a.

Further, in the monitoring sensor according to the embodiment shown in FIG. 9, the spacer 271 may be interposed between the first section 10 and the second section 20, and the position of the sensor 8 in the radial direction of the casing 7a may be adjusted by changing the thickness of the spacer 271.

Further, in the above embodiments where the bolt hole of one of two flange parts to be connected together is a slotted hole, and the bolt hole of the other is a circular hole, the bolt hole of the one flange part may be changed to a circular hole, and the bolt hole of the other may be changed to a slotted hole.

REFERENCE SIGNS LIST

1 Steam turbine
2 Rotor (Rotational shaft)
6 Rotating blade
7a Casing
7b Vane
8 Sensor
9 Monitoring sensor
10 First section
13 First fitting part
14 First flange part
15 Slotted hole
20 Second section 21 Second fitting part
75 Sensor protective part
210 Fixation part
211 Lower flange part (Second flange part)
220, 232 Sensor holding part
231 Flange part (Second flange part)

The invention claimed is:

1. A monitoring sensor for a state of a blade of a rotating machine, comprising:
a sensor for monitoring a state of the blade of the rotating machine;
a first section configured to be fixed to a casing of the rotating machine; and
a second section holding the sensor and supported by the first section so as to be able to adjust the sensor in an axial direction of the casing such that measurement of the sensor is performed in a predetermined orientation with respect to the blade,
wherein the second section holds the sensor so that a central axis of the first section and a central axis of the sensor are always parallel to each other.

2. The monitoring sensor according to claim 1,
wherein the second section is further configured to be rotatable relative to the first section about a central axis of the second section, and
wherein the sensor is disposed eccentrically with respect to a central axis of the first section.

3. The monitoring sensor according to claim 1,
wherein the first section includes a first fitting part composed of a circular recess or a circular projection concentric with a central axis of the first section, and
wherein the second section includes a second fitting part composed of a circular projection or a circular recess engaged with the recess or the projection of the first fitting part.

4. The monitoring sensor according to claim 1,
wherein the first section includes a first flange part having a plurality of first hole parts into which a plurality of fastening members are inserted respectively,
wherein the second section includes a second flange part having a plurality of second hole parts into which the plurality of fastening members are inserted respectively, the second flange part being connected to the first flange part by the plurality of fastening members,
wherein the first flange part and the second flange part are rotatable relative to each other, and
wherein at least one of the plurality of first hole parts or the plurality of second hole parts are slotted holes extending along a direction of relative rotation between the first flange part and the second flange part.

5. The monitoring sensor according to claim 1,
wherein the sensor is held by the second section rotatably about a central axis of the sensor parallel to a central axis of the first section.

6. The monitoring sensor according to claim 1,
wherein the second section includes:
a fixation part fixed to the first section rotatably about a central axis concentric with the first section; and
a sensor holding part holding the sensor and disposed eccentrically with respect to the central axis of the fixation part so as to be rotatable relative to the fixation part.

7. The monitoring sensor according to claim 1,
wherein the second section is configured to be variable in position in a radial direction of the casing, relative to the first section.

8. A position adjustment method for a sensor for monitoring a state of a blade of a rotating machine, with a first section being fixed to a casing of the rotating machine, and a second section holding the sensor and being supported by the first section, the method comprising:
a position adjustment step of changing a positional relationship between the first section and the second section to adjust a position of the sensor in an axial direction of the casing,
wherein the position adjustment step includes adjusting a position of the sensor in the axial direction of the casing so that a central axis of the first section and a central axis of the sensor are always parallel to each other.

9. The position adjustment method according to claim 8,
wherein the sensor is held by the second section rotatably about a central axis of the sensor parallel to a central axis of the first section, and
wherein the method comprises a rotation step of rotating the sensor about the central axis of the sensor.

10. A rotating machine comprising:
a rotational shaft provided with a plurality of blades;
a casing accommodating the rotational shaft;
a monitoring sensor for monitoring a state of the plurality of blades, the monitoring sensor being inserted in a through hole of the casing disposed along a radial direction of the casing, a tip of the monitoring sensor protruding to an inner side of the casing; and
a sensor protective part attached on an inner peripheral surface of the casing at a position upstream of the through hole with respect to a rotation direction of the blades.

* * * * *